United States Patent
Fukushima et al.

(10) Patent No.: US 8,820,901 B2
(45) Date of Patent: Sep. 2, 2014

(54) ELASTIC MEMBER FOR INKJET

(75) Inventors: Takashi Fukushima, Yokohama (JP);
Toshihiko Ujita, Yokohama (JP);
Akihiko Shimomura, Yokohama (JP);
Kyosuke Nagaoka, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/812,327

(22) PCT Filed: Jul. 15, 2011

(86) PCT No.: PCT/JP2011/066785
§ 371 (c)(1),
(2), (4) Date: Jan. 25, 2013

(87) PCT Pub. No.: WO2012/014826
PCT Pub. Date: Feb. 2, 2012

(65) Prior Publication Data
US 2013/0120509 A1    May 16, 2013

(30) Foreign Application Priority Data
Jul. 28, 2010   (JP) .................................. 2010-169147

(51) Int. Cl.
*B41J 2/175*    (2006.01)

(52) U.S. Cl.
USPC .......................................................... 347/85

(58) Field of Classification Search
USPC .................................................... 347/84–86
See application file for complete search history.

(56) References Cited

U.S. PATENT DOCUMENTS

| | | | | |
|---|---|---|---|---|
| 5,801,737 A | * | 9/1998 | Sato et al. | 347/86 |
| 7,325,913 B2 | * | 2/2008 | Sasaki et al. | 347/86 |
| 7,645,033 B2 | * | 1/2010 | Bulman et al. | 347/86 |
| 8,272,724 B2 | * | 9/2012 | Kanbe | 347/86 |

FOREIGN PATENT DOCUMENTS

| | | |
|---|---|---|
| CN | 2004-196844 A | 7/2004 |
| CN | 1714123 A | 12/2005 |
| CN | 1946558 A | 4/2007 |
| EP | 1741559 A | 1/2007 |
| JP | 2000-38460 A | 2/2000 |
| JP | 2005-305878 A | 11/2005 |
| JP | 1708549 A | 12/2005 |

* cited by examiner

Primary Examiner — Kristal Feggins
(74) Attorney, Agent, or Firm — Canon U.S.A., Inc., IP Division

(57) ABSTRACT

An elastic member for inkjet includes a resin composition including at least a (b)-(a)-(b) type isobutylene-based triblock copolymer including an isobutylene-based polymer block (a) and a styrene-based polymer block (b), and a styrene-based polymer.

17 Claims, 2 Drawing Sheets

ELASTIC MEMBER FOR INKJET

TECHNICAL FIELD

The present invention relates to an elastic member for inkjet. More specifically, the present invention relates to an elastic member for inkjet recording apparatuses, which is used for supplying ink from an ink tank to a recording head, particularly to an ink sealing member and a valve member to be used for an ink supply tube and an ink flow path.

BACKGROUND ART

Examples of the elastic member for inkjet include an ink supply tube, an ink sealing member, a valve member, and the like. The ink supply tube for inkjet connects an ink tank to a recording head mounted on a carriage and supplies ink retained in the ink tank to the recording head. The recording head mounted on the carriage reciprocates along the carriage to perform recording on a recording medium. In recent years, an inkjet printer has been more and more downsized, and the ink supply tube is required to have high flexibility to be used in a compactly-housed fashion. Further, when a viscosity of ink is increased when the ink inside the ink supply tube is evaporated outside the ink supply tube, an issue of print quality degradation or the like is raised due to ink discharge failure or a composition change of the ink. Therefore, the ink supply tube is required to have a high water vapor barrier property. Likewise, since an ink discharge failure or an ink supply failure can occur when bubbles are generated inside the ink supply tube due to entrance of an outside gas such as air, the ink supply tube is also required to have a high air barrier property. Further, since the ink sealing member and the valve member are often used in a compressed state to prevent ink leakage, they are required to have high rubber elasticity which enables to endure the shape change.

As a material for the ink supply tube member, the ink sealing member, and the valve member, a crosslinked rubber and a thermoplastic resin have heretofore been used. However, the use of crosslinked rubber entails issues such as long-time crosslinking and molding step, difficulty in two-color molding with another member, and the like. On the other hand, since the thermoplastic resin has higher rigidity as compared to the crosslinked rubber, the thermoplastic resin is not suitable for a member which is required to have high flexibility. Accordingly, a thermoplastic elastomer is receiving attention since it enables conveniently producing a molded article by press molding, injection molding, extrusion molding, or the like and is excellent in rubber elasticity and flexibility. Examples of the thermoplastic elastomer include olefin-based, urethane-based, ester-based, styrene-based, vinyl chloride-based thermoplastic elastomers, and the like. Among these, the styrene-based thermoplastic elastomer has superior flexibility and rubber elasticity. Examples of the styrene-based thermoplastic elastomer include a styrene-butadiene-styrene triblock copolymer (SBS), a styrene-isoprene-styrene triblock copolymer (SIS), a styrene-ethylene/butylene-styrene triblock copolymer (SEBS), a styrene-ethylene/propylene-styrene triblock copolymer (SEPS), and the like. Further, in recent years, the styrene-isobutylene-styrene triblock copolymer (SIBS) has been developed.

Japanese Patent Application Laid-Open No. 2005-305878 discusses an ink supply tube for inkjet, which is obtained by using a thermoplastic elastomer. In Japanese Patent Application Laid-Open No. 2005-305878, there is a description of an example in which a material containing SIBS, polypropylene, and liquid polybutene is used as a material for the ink supply tube for inkjet. The material is excellent in water vapor barrier property and air barrier property and has good flexibility.

However, though SBS, which is a generally known styrene-based thermoplastic elastomer, has already been used for various materials including a tube material, a sealing member material, and the like, the water vapor barrier property and the air barrier property are insufficient to be used for inkjet. On the other hand, though SIBS has the water vapor barrier property, the air barrier property, and flexibility which are appropriate for use for inkjet, its moldability is low, and it is difficult to mold SIBS when used alone. Accordingly, for moldability improvement, the blending with polypropylene which has good moldability is considered as described in Japanese Patent Application Laid-Open No. 2005-305878. However, the rubber elasticity is deteriorated due to the blending with polypropylene to sometimes make it difficult to use the obtained material as the elastic member for inkjet. Further, the deterioration of rubber elasticity is prominent particularly under a high temperature environment. Further, since the inkjet members are required to have high dimension accuracy, polystyrene having a small molding shrinkage ratio and high dimension accuracy is used as a material for various component parts for inkjet. Taking thermal fusion and ultrasonic welding with such polystyrene component members into consideration, the blending with polypropylene makes it impossible to perform the welding due to the immiscibility with polystyrene.

SUMMARY OF INVENTION

The present invention is directed to an elastic member for inkjet which is excellent in flexibility, rubber elasticity, air barrier property, and water vapor barrier property and has good moldability and weldability with polystyrene component parts.

According to an aspect of the present invention, an elastic member for inkjet includes a resin composition comprising a (b)-(a)-(b) type isobutylene-based triblock copolymer including an isobutylene-based polymer block (a) and a styrene-based polymer block (b), and a styrene-based polymer.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

(Component A: Isobutylene-Based Triblock Copolymer)

Figure 1:
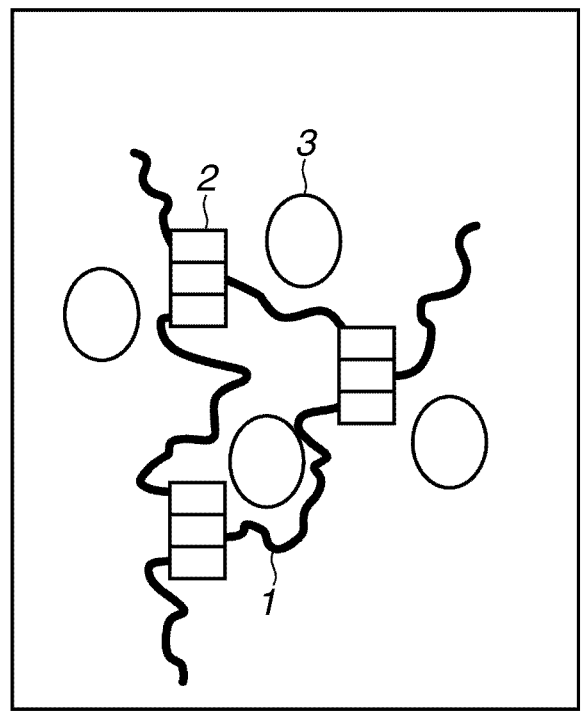
FIG. 1 is a diagram schematically illustrating an isobutylene-based triblock copolymer according to an exemplary embodiment of the present invention.

Component A: an isobutylene-based triblock copolymer according to the exemplary embodiment of the present invention is a (b)-(a)-(b) type isobutylene triblock copolymer which includes an isobutylene-based polymer block (a) and a styrene-based polymer block (b) and falls under the category of thermoplastic elastomers. FIG. 1 is a diagram schematically illustrating that the isobutylene-based triblock copolymer is the thermoplastic elastomer. The isobutylene-based polymer block (a) 1 is called a soft segment, and the styrene-based polymer bloc (b) 2 is called a hard segment. The hard segment functions as a pseudo crosslinking point, and the soft segment has flexibility. Therefore, rubber elasticity is exhibited when structures of both of the segments are provided. On the other hand, thermoplasticity is also imparted since crosslinking is not fully completed. The isobutylene-based polymer block (a) means a polymer block containing at least an isobutylene unit. Except for the isobutylene unit, examples of a monomer which forms a unit which may be contained include ethylene, propylene, 1-butene, pentene, 2-methyl-1-butene, norbornene, butadiene, isoprene, cyclopentadiene, and the like. These may be used alone or in combination of two or more. The styrene-based polymer block (b) means a polymer block containing at least one of a styrene unit and a styrene derivative unit. Examples of the styrene derivative unit include a styrene derivative unit such as α-methylstyrene, β-methylstyrene, p-methylstyrene, p-chlorostyrene, p-bromostyrene, and 2,4,5-tribromostyrene. These maybe used alone or in combination of two or more. Except for the styrene unit and the styrene derivative unit, examples of a monomer which forms a unit which may be contained include vinyl naphthalene, indene, and the like. These may be used alone or in combination of two or more. The component A: isobutylene-based triblock copolymer may have various structures depending on combinations of the isobutylene-based polymer block (a) and the styrene-based polymer block (b). Examples of the structures include a styrene-isobutylene-styrene triblock copolymer (SIBS), a styrene-ethylene/butylene-styrene triblock copolymer (SEBS), a styrene-isoprene-styrene triblock copolymer (SIS), and the like. The components A may be used alone or in combination of two or more. A blending ratio of the styrene-based polymer block (b) in the component A: isobutylene-based triblock copolymer may preferably be 10 to 50 percent by weight from the view point of a balance between moldability and rubber elasticity required for use for inkjet. The moldability is improved when the blending ratio is 10 percent by weight or more, and the rubber elasticity is improved when the blending ratio is 50 percent by weight or less. From the view points of moldability, barrier property, and the like, a weight average molecular weight of the isobutylene-based triblock copolymer may preferably be, but not particularly limited to, 40000 to 100000. A production method for the component A: isobutylene-based triblock copolymer is not particularly limited, and any known method may be employed. For example, it is possible to obtain the (b)-(a)-(b) isobutylene-based triblock copolymer by living cation polymerization.

(Component B: Styrene-Based Polymer)

In the exemplary embodiment of the present invention, a component B: a styrene-based polymer 3 is blended with the component A: isobutylene-based triblock copolymer as a lubricant for improving moldability. Due to the blending of the component B: styrene-based polymer, fluidity and a cooling rate of a resin composition during molding are improved, thereby improving moldability. Further, in extrusion molding, it is possible to maintain the shape immediately after extrusion from a nozzle. The component B: styrene-based polymer means a polymer containing at least one of a styrene unit and a styrene derivative unit. Examples of the styrene derivative include those exemplified for the styrene-based polymer block (b). Examples of a monomer which forms a unit which may be contained include those exemplified for the styrene-based polymer block (b). Examples of the component B: styrene-based polymer include polymers of styrene derivatives, such as polystyrene (GPPS), high impact polystyrene (HIPS), α-methylstyrene, β-methylstyrene, p-methylstyrene, p-chlorostyrene, p-bromostyrene, and 2,4,5-tribromostyrene. These maybe used alone or in combination of two or more. Among others, if the component B: styrene-based polymer is HIPS which is obtained by copolymerization with a rubber component such as polybutadiene, such component B is preferred since it enables improving strechability and strength of the resin composition obtained by mixing the component A and the component B as compared to the polymer obtained by using styrene polymer alone. It should be noted that the component A: isobutylene-based triblock copolymer is not included in the component B: styrene-based polymer.

(Elastic Member for Inkjet)

The elastic member for inkjet according to an exemplary embodiment of the present invention contains a resin composition which contains at least the component A and the component B. Since the resin composition contains the component B: styrene-based polymer as a lubricant, the resin composition has high weldability with polystyrene and has high two-color moldability, insert and outsert moldability, ultrasonic weldability, and heat weldability with polystyrene component members. A molding shrinkage ratio of polystyrene is ordinarily from 0.4% to 0.7%, which offers superior dimension accuracy as compared to the molding shrinkage ratio of polypropylene (1.0% to 2.5%). Therefore, polystyrene is more often used for various component parts which are required to have dimension accuracy, but the conventional resin compositions in which polyolefin is blended cannot attain good weldability with polystyrene component parts. However, with the use of the resin composition according to the present exemplary embodiment of the present invention, the welding with the polystyrene component parts is facilitated. Further, if physical properties of resin compositions which are prepared by blending each of polystyrene and polypropylene in an identical amount with the component A are compared, great differences are observed in hardness and tensile permanent elongation. The resin composition in which polystyrene is blended has lower values for both of the hardness and the tensile permanent elongation and is superior in physical properties as the elastic member for inkjet as compared to the resin composition in which polypropylene is blended. It is considered that dispersibility and a sea-island structure of polystyrene influence the hardness, and that high heat resistance of polystyrene influences the tensile permanent elongation. Further, since the component B: styrene-based polymer which has the higher dimension accuracy than polyolefin is contained in the resin composition itself, the elastic member for inkjet which contains the resin composition has excellent dimension accuracy. A blending ratio of the component A: isobutylene-based triblock copolymer may preferably be 50 percent by weight or more and 90 percent by weight or less from the viewpoints of air barrier property, water vapor barrier property, rubber elasticity, and flexibility. Further, as to a blending ratio of the component B: styrene-based polymer in the resin composition, a blending ratio which is required as the lubricant is variable depending on the shape of an article to be molded, a molding method, and the like. However, from the viewpoints of rubber elasticity, flexibility, water vapor barrier property, and air barrier property, the blending ratio may preferably be 5 percent by weight or more and 30 percent by weight or less. The resin composition may preferably contain a styrene-ethylene/butylene-styrene triblock copolymer (SEBS) in addition to the component A and the component B. SEBS is a material having excellent moldability, and moldability of the resin composition is improved when alloyed with SEBS. Further, since SEBS has relatively high water vapor barrier property and air barrier property among styrene-based thermoplastic elastomers, the resin composition is capable of maintaining the high water vapor barrier property and air barrier property when the amount of SEBS is small. A blending ratio of SEBS in the resin composition may preferably be 5 percent by weight or more and 30 percent by weight or less from the viewpoints of moldability, water vapor barrier property, and air barrier property. A weight average molecular weight of SEBS may preferably be, but not particularly limited to, within the range of 40000 to 120000 from the viewpoints of moldability and the like. To the resin composition, a petrol-based softening agent, paraffin oil, a compound such as polybutene, or the like may be blended as required as a compatibilizing agent for improving kneadability of the resin composition. Further, the compound is capable of imparting flexibility to the resin composition and adjusting the hardness in addition to the function as compatibilizing agent. Among the above, polybutene has relatively high water vapor barrier property and air barrier property, and reductions in water vapor barrier property and air barrier property are small when it is blended with the resin composition. However, since the compatibilizing agent such as the petrol-based softening agent, paraffin oil, and polybutene reduces tensile strength and rubber elasticity of the resin composition, a blending ratio of the compatibilizing agent may preferably be 5 percent by weight or more and 20 percent by weight or less, more preferably 5 percent by weight or more and 15 percent by weight or less. Examples of polybutene include a homopolymer of isobutene obtained by polymerization using isobutene as a main monomer or a copolymer of isobutene and n-butene and the like. A number average molecular weight of polybutene may preferably be 400 to 10000. In addition to the above-described components, the resin composition may contain various components as required within the range which does not impair the effect of the present invention. For example, various additives such as a lubricant, a surfactant, an anti-oxidant, an anti-aging agent, an adhesive, a pigment, and the like may appropriately be contained. Since the component A: isobutylene-based triblock copolymer contained in the resin composition has a bulky and nonpolar isobutylene structure, the resin composition has high water vapor barrier property and air barrier property. A water vapor permeation rate [JIS Z 0208 (CUP method), sheet having a thickness of 0.5 mm, 40° C90RH] of the resin composition may preferably be 2.0 g/m$^2$·24 h or less. The water vapor permeation rate may more preferably be 1.5 g/m$^2$·24 h or less. Further, an air permeation rate [JIS K 7126 (differential pressure method), sheet having a thickness of 0.5 mm, 23° C.] of the resin composition may preferably be $2.5 \times 10^{-10}$ cm$^3$·cm/cm$^2$·s·cmHg or less. The air permeation rate may more preferably be $1.5 \times 10^{-10}$ cm$^3$·cm/cm$^2$·s·cmHg or less. The water vapor permeation rate and the air permeation rate of the resin composition within the above-specified ranges are preferred since such water vapor permeation rate and air permeation rate enable having the water vapor barrier property and air barrier property suitable for use for inkjet. The lower the values of the water vapor permeation rate and the air permeation rate, the more the water vapor barrier property and the air barrier property are desirably improved. Examples of a production method and a molding method for the resin composition include the following methods, for example. To a kneading apparatus such as a Bunbury mixer, a kneader, a roll, or the like, the component A: isobutylene triblock copolymer, and the component B: styrene-based polymer are thrown into together with SEBS, the petrol-based softening agent, paraffin oil, or polybutene, and other various additive components. The components are molten and kneaded at a temperature from 140° C. to 230° C. to obtain a homogeneous resin composition. After that, the resin composition is pelletized by a pelletizer. It is possible to mold the pelletized resin composition by extrusion molding, injection molding, press molding, blow molding, or the like. The resin composition has well-balanced flexibility, water vapor barrier property, air barrier property, rubber elasticity, strength, moldability, and the like. Therefore, the resin composition is suitably used as a material for the elastic member for inkjet, such as the ink supply tube for inkjet, the ink sealing member for inkjet, and the valve member for inkjet.

(Ink Supply Tube for Inkjet)

Figure 2:
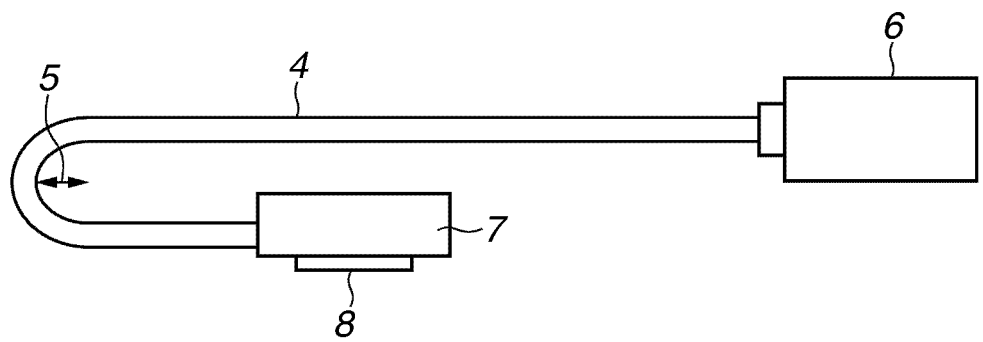
FIG. 2 is a diagram schematically illustrating an example of an ink supply tube for inkjet according to an exemplary embodiment of the present invention.

FIG. 2 is a diagram schematically illustrating an example of mode of use of an ink supply tube for inkjet. The ink supply tube for inkjet 4 connects an ink tank 6 to a recording head 8 mounted on a carriage 7 and supplies ink retained in the ink tank 6 to the recording head 8. In general, the recording head 8 performs printing by reciprocating along the carriage 7, and, therefore, it is necessary for the ink supply tube 4 to follow the movement and to avoid imparting a reactive force to the carriage 7 as much as possible while it follows the movement. Accordingly, the ink supply tube 4 is required to have flexibility. For instance, if the reciprocation is performed when the ink supply tube 4 is housed in the main body of the printer in the shape of the letter U with a curvature radius 5 of 35 mm, the hardness (JIS K 6253, Shore A) of the resin composition contained in the ink supply tube 4 may preferably be 30 or more and 70 or less. Though the suitable range of the hardness is varied depending on the usage, it is possible to obtain the resin composition having low hardness without blending any softening agent since the resin composition contains the component A: isobutylene-based triblock copolymer. Further, the ink supply tube 4 is required to have a high water vapor barrier property and air barrier property. When the air is permeated into the ink supply tube 4, ink discharge can be disturbed, or a failure in ink supply can occur. Further, when water contained in the ink is permeated to the outside of the ink supply tube 4, viscosity of the ink is raised to cause possibility of a failure in printing. Though it is possible to improve the water vapor barrier property and air barrier property by increasing a thickness of the ink supply tube 4, such a thickness increase entails a reduction in flexibility and an increase in cost, and, therefore, the thickness may preferably be 3 mm or less. Taking the above-described circumstances into consideration, the water vapor permeation rate and the air permeation rate of the resin composition may preferably be within the above-specified range in the ink supply tube 4.

(Sealing Member)

Figure 3:
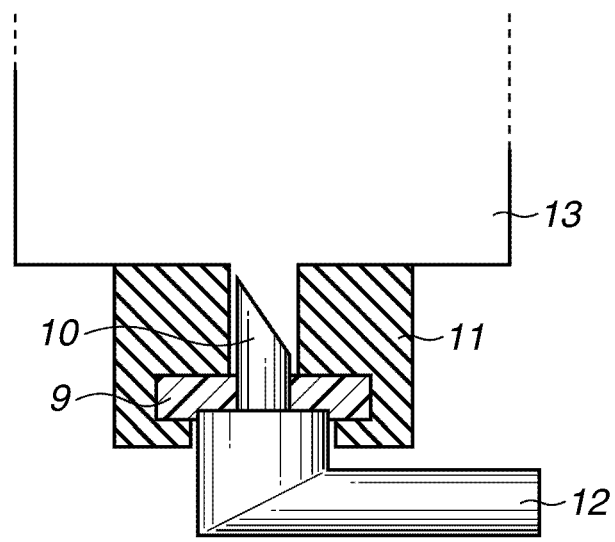
FIG. 3 is a sectional view illustrating an example of an ink sealing member for inkjet according to an exemplary embodiment of the present invention.

FIG. 3 is a sectional view illustrating an example of a mode of use of a sealing member. The ink is supplied to the recording head through an ink supply flow path 12 when a tapered ink intake tube 10 is inserted into a sealing member 9 provided in a rubber case 11 of an ink tank 13. Since the ink tank 13 is normally fixed inside a printer in a state where the ink intake tube 10 is inserted, a stress is continuously applied to the ink sealing member 9. Therefore, the ink sealing member 9 is required to have a rubber elasticity which enables maintaining the elasticity over time and irrespective of environmental change and prevents ink leakage. If the tensile permanent elongation is used as an index for the rubber elasticity, a tensile permanent elongation (JIS K 6262, 70° C., 48 h, 100% elongation) of the resin composition contained in the ink sealing member 9 in the present usage may preferably be 60% or less, more preferably 30% or less. The tensile permanent elongation may preferably be low as possible since the rubber elasticity is improved along with a reduction in value of the tensile permanent elongation. Further, in the case of using the resin composition for a valve member for inkjet, the tensile permanent elongation of the resin composition contained in the valve member for inkjet may preferably be within the above-specified range since the valve member for inkjet is kept in the state where a stress is continuously applied thereto and since the rubber elasticity is required as well.

Hereinafter, examples of the present invention will be described, but the present invention is not limited to the examples.

(Evaluation Method)

(1) Hardness (Type A)

Hardness of each of resin compositions prepared in Examples and Comparative Examples was measured according to JIS K 6253, and evaluation was conducted based on the following criteria.

○: Hardness of 70 or less.

×: Hardness above 70.

(2) Water Vapor Permeation Rate

A water vapor permeation rate of each of sheets having a thickness of 0.5 mm and prepared by using the resin compositions prepared in Examples and Comparative Examples was measured according to JIS Z 0208 (CUP method) under the condition of 40° C90RH, and evaluation was conducted based on the following criteria.

○: 2.0 g/m$^2$·24 h or less.

×: Above 2.0 g/m$^2$·24 h.

(3) Air Permeation Rate

An air permeation rate of each of sheets having a thickness of 0.5 mm and prepared by using the resin compositions prepared in Examples and Comparative Examples was measured according to JIS K 7126 (differential pressure method) under the condition of 23° C., and evaluation was conducted based on the following criteria.

○: $2.5 \times 10^{-10}$ cm$^3$·cm/cm$^2$·s·cmHg or less.

×: Above $2.5 \times 10^{-10}$ cm$^3$·cm/cm$^2$·s·cmHg.

(4) Tensile Permanent Elongation

Tensile permanent elongation of each of the resin compositions prepared in Examples and Comparative Examples was measured according to JIS K 6262 under the conditions of 70° C., for 48 h, and 100% elongation, and evaluation was conducted based on the following criteria.

○: 60% or less.

×: Above 60%.

(5) Moldability

Extrusion moldability of ink supply tubes and injection moldability of ink sealing members were evaluated based on the following criteria.

○: Molded article did not have any appearance issue such as scratch, burr, and shortness.

×: Molded article had an appearance issue such as scratch, burr, and shortness.

(6) Weldability with Polystyrene (PS) Component Part

Weldability of each of the ink supply tubes with a joint obtained by molding polystyrene (PS) was evaluated. The welding of the ink supply tube with the joint was performed by outsert molding by pouring a molten material for the joint into the molded ink supply tube and allowing the material to set.

○: The welded part was not peeled off by reciprocal driving of the ink supply tube.

×: The welded part was peeled off by reciprocal driving of the ink supply tube.

(Blended Materials)

As blended materials, the following materials were used.

EXAMPLES (Component A) Elastomer A:

Styrene-isobutylene-styrene triblock copolymer (SIBS) (manufactured by Kaneka Corporation; trade name: SIBSTAR 073T).

Elastomer B: Styrene-isobutylene-styrene triblock copolymer (SIBS) (manufactured by Kaneka Corporation; trade name: SIBSTAR 103T).

Elastomer C: Styrene-ethylene/butylene-styrene triblock copolymer (SEBS) (manufactured by Kuraray Co., Ltd.; trade name: SEPTON 8007).

Elastomer D: Styrene-isoprene-styrene triblock copolymer (SIS) (manufactured by JSR Corporation; trade name: SIS5002).

(Component B)

Thermoplastic resin A (styrene-based resin): Polystyrene (GPPS) (manufactured by PS Japan Corporation; trade name: HF77).

Thermoplastic resin B (styrene-based resin): High impact polystyrene (HIPS) (manufactured by PS Japan Corporation; trade name: HT478).

Comparative Examples

Thermoplastic resin C: Polypropylene (PP) (manufactured by Japan Polypropylene Corporation; trade name: Novatec PP EA7A).

Thermoplastic resin D: Polyethylene (PE) (manufactured by Prime Polymer Co., Ltd.; trade name: NEO-ZEX5000SF).

Compatibilizing agent A: Paraffin (manufactured by Nippon Oil Corporation; trade name: Diana process oil PW150).

Compatibilizing agent B: Polybutene (PB) (manufactured by Idemitsu Kosan Co., Ltd.; trade name: HV-300).

(Preparation Method)

Each of homogenous resin compositions was prepared by throwing the blended materials into a Bunbury mixer at blending ratios illustrated in Table 1 and melting and kneading at 160° C. After that, a pelletized resin composition was obtained by pelletization using a pelletizer. The pelletized resin composition was extrusion-molded to prepare an ink supply tube having a thickness of 2 mm. Further, the pelletized resin composition was injection-molded to prepare an ink sealing member having a thickness of 1 mm. Evaluation results of the resin compositions, ink supply tubes, and ink sealing members are illustrated in Table 1 (Examples 1 to 6 and Comparative Examples 1 to 6).

TABLE 1

| | | Examples | | | | | | Comparative Examples | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Blending ratio [%] | Elastomer A (SIBS) | 85 | 85 | 75 | 60 | 65 | | 100 | | | | 60 | 75 |
| | Elastomer B (SIBS) | | | | | 75 | | | | | | | |
| | Elastomer C (SEBS) | | | 10 | 5 | 20 | 5 | | | 60 | | | 15 |
| | Elastomer D (SIS) | | | | | | | | | | 60 | | |
| | Thermoplastic resin A (GPPS) | | 15 | | | | | | | | | | |
| | Thermoplastic resin B (HIPS) | 15 | | 10 | 20 | 5 | 10 | | | | | | |
| | Thermoplastic resin C (PP) | | | | | | | | | 30 | 30 | 30 | 10 |
| | Thermoplastic resin D (PE) | | | | | | | | 100 | | | | |
| | Compatibilizing agent A (paraffin) | | | 5 | | | | | | 10 | 10 | | |
| | Compatibilizing agent B (PB) | | | | 15 | 10 | 10 | | | | | 10 | |
| Evaluation item | Hardness | ○ | ○ | ○ | ○ | ○ | ○ | — | X | X | X | X | ○ |
| | Water vapor permeation rate | ○ | ○ | ○ | ○ | ○ | ○ | — | — | X | X | ○ | ○ |
| | Air permeation rate | ○ | ○ | ○ | ○ | ○ | ○ | — | — | X | X | ○ | ○ |
| | Tensile permanent elongation | ○ | ○ | ○ | ○ | ○ | ○ | — | X | ○ | ○ | X | X |
| | Extrusion moldability | ○ | ○ | ○ | ○ | ○ | ○ | X | ○ | ○ | ○ | ○ | ○ |
| | Injection moldability | ○ | ○ | ○ | ○ | ○ | ○ | X | — | ○ | ○ | ○ | ○ |
| | Weldability with PS component part | ○ | ○ | ○ | ○ | ○ | ○ | — | X | X | X | X | X |

Examples 1 to 6 attained the high marks in all of the evaluation items, while each of Comparative Example 1 to 6 had an issue in any of the evaluation items. As a result of using SIBS as the component A, Examples 1 to 6 attained the high water vapor barrier property, air barrier property, flexibility, and rubber elasticity which are required for use for inkjet. Further, moldability, dimension accuracy, and weldability with polystyrene component parts were improved due to the use of GPPS or HIPS as the component B. Further, the high rubber elasticity was maintained under the high temperature environment. In contrast, in Comparative Examples, kneading and molding were difficult if SIBS was used alone as the resin composition (Comparative Example 1). If PE was used alone as the resin composition, hardness was too high, and the rubber elasticity was unsatisfactory (Comparative Example 2). If SEBS or SIS was used as the component A in place of SIBS, satisfactory water vapor barrier property and air barrier property were not attained (Comparative Examples 3 and 4). If SIBS and PP were blended, the hardness and tensile permanent elongation were high, and the weldability with polystyrene component parts was unsatisfactory (Comparative Example 5). Further, if the blending ratio of PP was reduced to improve the drawbacks, the value of the tensile permanent elongation was unsatisfactory (Comparative Example 6). As described above, according to the present invention, it is possible to obtain the elastic member for inkjet which has the properties required for use for inkjet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-169147 filed Jul. 28, 2010, which is hereby incorporated by reference herein in its entirety.

The invention claimed is:

1. An ink supply tube comprising an elastic member for inkjet, the elastic member comprising:
a resin composition comprising a (b)-(a)-(b) type isobutylene-based triblock copolymer including an isobutylene-based polymer block (a) and a styrene-based polymer block (b), and a styrene-based polymer,
wherein the ink supply tube connects an ink tank to a recording head to supply ink retained in the ink tank to the recording head, and
wherein the resin composition has a hardness (JIS K 6253, Shore A) of 30 or more and 70 or less.

2. The ink supply tube for inkjet according to claim 1, wherein the styrene-based polymer contains at least high impact polystyrene.

3. The ink supply tube for inkjet according to claim 1, wherein the resin composition has a water vapor permeation rate [JIS Z 0208 (CUP method), a sheet having a thickness of 0.5 mm, 40° C90RH] of 2.0 g/m²·24 h or less and an air permeation rate [JIS K 7126 (differential pressure method), a sheet having a thickness of 0.5 mm, 23° C.] of $2.5 \times 10^{-10}$ cm³·cm/cm²·s·cmHg or less.

4. The ink supply tube for inkjet according to claim 3, wherein the resin composition further comprises a compatibilizing agent of which a blending ratio is 5 percent by weight or more and 20 percent by weight or less.

5. The ink supply tube for inkjet according to claim 4, wherein the compatibilizing agent is polybutene.

6. The ink supply tube for inkjet according to claim 1, wherein the resin composition further comprises a styrene-ethylene/butylene-styrene triblock copolymer.

7. An elastic member for inkjet, comprising:
a resin composition comprising a (b)-(a)-(b) type isobutylene-based triblock copolymer including an isobutylene-based polymer block (a) and a styrene-based polymer block (b), and a styrene-based polymer,
wherein the styrene-based polymer contains at least high impact polystyrene.

8. The elastic member according to claim 7, wherein the resin composition has a water vapor permeation rate [JIS Z 0208 (CUP method), a sheet having a thickness of 0.5 mm, 40° C90RH] of 2.0 g/m$^2$·24 h or less and an air permeation rate [JIS K 7126 (differential pressure method), a sheet having a thickness of 0.5 mm, 23° C.] of $2.5 \times 10^{-10}$ cm$^3$·cm/cm$^2$·s·cmHg or less.

9. The elastic member according to claim 7,
wherein the resin composition has a water vapor permeation rate [JIS Z 0208 (CUP method), a sheet having a thickness of 0.5 mm, 40° C90RH] of 2.0 g/m$^2$·24 h or less and an air permeation rate [JIS K 7126 (differential pressure method), a sheet having a thickness of 0.5 mm, 23° C.] of $2.5 \times 10^{-10}$ cm$^3$·cm/cm$^2$·s·cmHg or less, and
wherein the resin composition further comprises a compatibilizing agent of which a blending ratio is 5 percent by weight or more and 20 percent by weight or less.

10. The elastic member according to claim 7,
wherein the resin composition has a water vapor permeation rate [JIS Z 0208 (CUP method), a sheet having a thickness of 0.5 mm, 40° C90RH] of 2.0 g/m$^2$·24 h or less and an air permeation rate [JIS K 7126 (differential pressure method), a sheet having a thickness of 0.5 mm, 23° C.] of $2.5 \times 10^{-10}$ cm$^3$·cm/cm$^2$·s·cmHg or less,
wherein the resin composition further comprises a compatibilizing agent of which a blending ratio is 5 percent by weight or more and 20 percent by weight or less, and
wherein the compatibilizing agent is polybutene.

11. An ink supply tube comprising the resin composition according to claim 7, wherein the ink supply tube connects an ink tank to a recording head to supply ink retained in the ink tank to the recording head, and
wherein the resin composition has hardness (JIS K 6253, Shore A) of 30 or more and 70 or less.

12. A sealing member for inkjet, comprising the resin composition according to claim 7, wherein the sealing member seals a connection portion between an ink supply opening of an ink tank and an ink intake tube configured to supply ink to a recording head when the ink tank is mounted on an inkjet recording apparatus, and
wherein the resin composition has tensile permanent elongation (JIS K 6262, 70° C., 48 h, 100% elongation) of 60% or less.

13. An elastic member for inkjet, comprising:
a resin composition comprising a (b)-(a)-(b) type isobutylene-based triblock copolymer including an isobutylene-based polymer block (a) and a styrene-based polymer block (b), and a styrene-based polymer,
wherein the resin composition has a water vapor permeation rate [JIS Z 0208 (CUP method), a sheet having a thickness of 0.5 mm, 40° C90RH] of 2.0g/m$^2$·24 h or less and an air permeation rate [JIS K 7126 (differential pressure method), a sheet having a thickness of 0.5 mm, 23° C.] of $2.5 \times 10^{-10}$ cm$^3$·cm/cm$^2$·s·cmHg or less.

14. The elastic member for inkjet according to claim 13, wherein the resin composition further comprises a compatibilizing agent of which a blending ratio is 5 percent by weight or more and 20 percent by weight or less.

15. The elastic member for inkjet according to claim 13,
wherein the resin composition further comprises a compatibilizing agent of which a blending ratio is 5 percent by weight or more and 20 percent by weight or less, and
wherein the compatibilizing agent is polybutene.

16. An ink supply tube comprising the resin composition according to claim 13, wherein the ink supply tube connects an ink tank to a recording head to supply ink retained in the ink tank to the recording head,
wherein the resin composition has hardness (JIS K 6253, Shore A) of 30 or more and 70 or less.

17. A sealing member comprising an elastic member for inkjet, the elastic member comprising:
a resin composition comprising a (b)-(a)-(b) type isobutylene-based triblock copolymer including an isobutylene-based polymer block (a) and a styrene-based polymer block (b), and a styrene-based polymer,
wherein the sealing member seals a connection portion between an ink supply opening of an ink tank and an ink intake tube configured to supply ink to a recording head when the ink tank is mounted on an inkjet recording apparatus, and
wherein the resin composition has tensile permanent elongation (JIS K 6262, 70° C., 48 h, 100% elongation) of 60% or less.

* * * * *